United States Patent [19]

Yokoe et al.

[11] Patent Number: 5,309,075
[45] Date of Patent: May 3, 1994

[54] DIGITAL SERVO-CONTROL APPARATUS FOR PREVENTING TORQUE VARIATIONS

[75] Inventors: Isamu Yokoe, Obu; Toshio Kohno, Nagoya; Yasunori Masegi, Anjo, all of Japan

[73] Assignee: Toyoda Koki Kabushiki Kaisha, Kariya, Japan

[21] Appl. No.: 673,384

[22] Filed: Mar. 22, 1991

[30] Foreign Application Priority Data

Mar. 23, 1990 [JP] Japan .................. 2-074047
Mar. 27, 1990 [JP] Japan .................. 2-079157
Mar. 28, 1990 [JP] Japan .................. 2-081980

[51] Int. Cl.[5] .................. G05B 1/03; G05B 13/02
[52] U.S. Cl. .................. 318/608; 318/632; 318/650; 318/799
[58] Field of Search ............. 318/439, 628, 138, 437, 318/608, 632, 650, 798–800

[56] References Cited

U.S. PATENT DOCUMENTS

| | | | |
|---|---|---|---|
| 4,074,175 | 2/1978 | Born et al. .................. | 318/332 |
| 4,088,935 | 5/1978 | D'Arte et al. .................. | 318/227 |
| 4,477,762 | 10/1984 | Kurakake et al. . | |
| 4,774,651 | 9/1988 | El-Ibiary et al. .................. | 318/632 X |
| 4,792,742 | 12/1989 | Fujimoto et al. .................. | 318/805 |
| 4,839,819 | 6/1989 | Begin et al. .................. | 318/650 X |
| 4,868,476 | 9/1989 | Respaut .................. | 318/632 |
| 4,902,950 | 2/1990 | Kawamura et al. .................. | 318/632 X |
| 4,967,134 | 10/1990 | Losic et al. .................. | 318/650 X |
| 5,057,759 | 10/1991 | Ueda et al. .................. | 318/616 |
| 5,105,137 | 4/1992 | Iijima .................. | 318/632 X |
| 5,159,254 | 10/1992 | Teshima .................. | 318/632 X |

FOREIGN PATENT DOCUMENTS 0191870 8/1986 European Pat. Off. .
0310050 4/1989 European Pat. Off. .
2104692 3/1983 United Kingdom .
2133591 7/1984 United Kingdom .

*Primary Examiner*—William M. Shoop, Jr.
*Assistant Examiner*—Brian Sircus
*Attorney, Agent, or Firm*—Oblon, Spivak, McClelland, Maier & Neustadt

[57] ABSTRACT

An apparatus for preventing torque variation in a digitally controlled servomotor. Electrical angles $\theta_1$ and $\theta_2$ of the exciting magnetic field or the armature coil at respective timings of detecting and controlling a load current are obtained. The current is dq-transformed with $\theta_1$ and inverse-dq-transformed with $\theta_2$. As a result, even if there is a displacement of the actual electrical angle owing to the rotation of the armature during computing, it is possible to execute accurate current control. Further, at the time of calibration of the control system, the load currents are detected to be dq-transformed. From the d-axis components and q-axis components, values related to the offset and the amplification factor of the current detection systems are calculated. During the actual operation of the servomotor, the detected current value is corrected using the values. Further, the detection of the load current is performed plural times in one control cycle. Thereupon, a statistical average value is obtained as the detected current. Accordingly, an undesirable variation of the output torque is prevented.

4 Claims, 10 Drawing Sheets

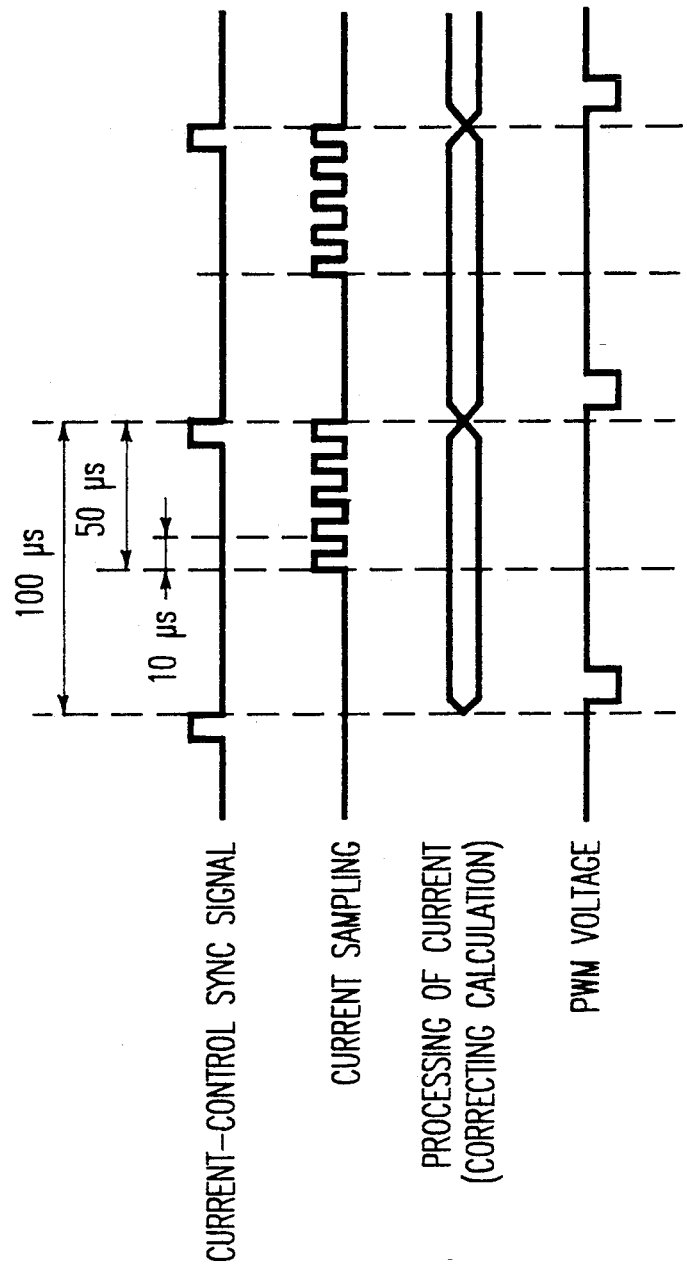

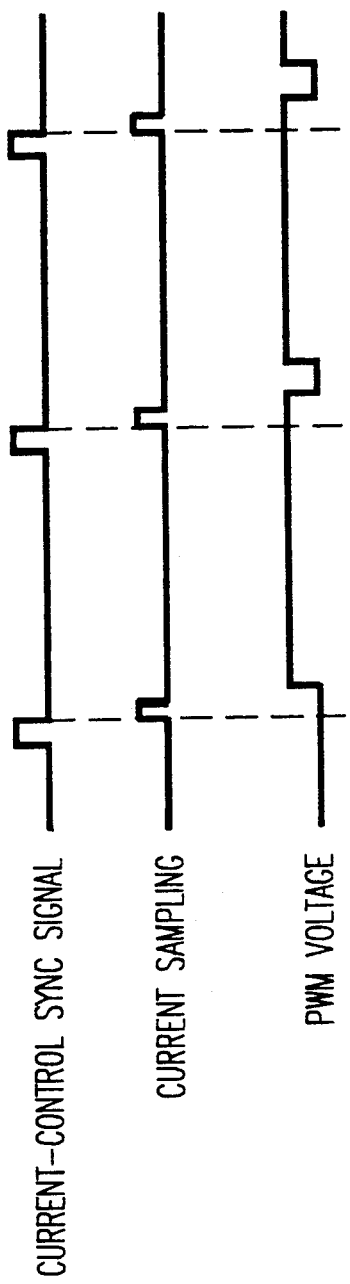

DIGITAL SERVO-CONTROL APPARATUS FOR PREVENTING TORQUE VARIATIONS

BACKGROUND OF THE INVENTION

1. Field of the Invention

The present invention relates to a digital servo-control apparatus for digitally controlling an AC servomotor and, more particularly, relates to apparatus adapted for preventing the output torque of the servomotor from fluctuating.

2. Description of the prior art

In order to avoid difficulties involved in analog control systems, a digital servo-control apparatus has recently come into use. In the digital servo-control apparatus, the target value and the feedback value are provided as digital values and the difference therebetween is calculated by a digital computer. Further, the command value according to the difference is provided as a digital value and the controlled amount (rotational angle, rotational velocity, or load current) to a controlled system, i.e., a servomotor is digitally controlled by the command value. Such servo-control apparatus, in general, have the feedback loops for a position, a velocity, and a current.

In the current feedback loop of such feedback loops, the load current is detected by a current transformer (CT), the output thereof is amplified by an analog amplifier, and the output thereof is sampled at intervals of a predetermined period to be digitized. The detected current of each phase is subjected to a dq-transformation. The load current supplied to the servomotor is feedback-controlled so that the resultant d-axis component and q-axis component of the detected current become equal to the respective target values.

The d-axis component of the load current represents the reactive current, while the q-axis component is proportional to the output torque of the servomotor when the servomotor is a synchronous motor and the strength of the exciting magnetic field is constant. Accordingly, when the servomotor is a synchronous motor, the feedback control of the load current is executed so that the d-axis component of the detected load current becomes zero and the detected q-axis component becomes equal to the target current proportional to the target output torque.

As described above, the d-axis component and the q-axis component have only DC components, respectively, regardless of the electrical angle, i.e., the phase angle of the load current. Accordingly, the dq-transformation method has an advantage that the current control to the servomotor becomes easier. Here, the electrical angle is defined as the angle formed between the exciting magnetic field and the reference axis of the armature coil in the case of a synchronous motor. More concretely, the electrical angle is, for example, the rotational angle of the revolving magnetic field in a revolving-field type synchronous motor, the rotational angle of the armature in a revolving-armature type synchronous motor, or the rotational angle of the revolving magnetic field referenced from the primary side (stationary coordinate system) in an induction motor.

In performing the above described dq-transformation of the detected load current and the inverse dq-transformation for getting a command value of current from the command values of the dq-components, the electrical angle must be given. The electrical angle is generally assumed to be constant during the control period of the velocity feedback loop.

Therefore, in the conventional apparatus, the same assumed electrical angle is used in both dq-transformation of the detected load current and inverse dq-transformation for getting the command value. However, the actual electrical angle at which the command value is output is advanced with respect to the assumed electrical angle because of computing time by the digital computer. Accordingly, the conventional apparatus has a problem that the difference between the actual electrical angle and the assumed electrical angle used in the control of the servomotor becomes large and, hence, it becomes unable to obtain an accurate command value of the phase current to be controlled. Because of this, the conventional system has a problem that the output torque of the servomotor tends to fluctuate.

The d-axis component and the q-axis component of the load current are essentially direct currents independent of the frequency of rotation of the revolving magnetic field or the revolving armature.

However, it has been found by the present inventors that the d-axis component is, in reality, not zero but has a DC component, a fundamental wave with the same frequency as the frequency of rotation of the revolving magnetic field or the revolving armature, and a second harmonic, as shown in FIG. 7, and the q-axis component has a DC component not corresponding to the output torque of the servomotor, a fundamental wave with the same frequency as the frequency of rotation of the revolving field or the revolving armature, and a second harmonic, as shown in FIG. 8.

In the feedback control, the load current is controlled according to the instantaneous values of the d-axis component and the q-axis component of the load current detected at intervals of a predetermined period and the target values of the same. Therefore, the power-factor decreases when there is an error in the DC component of the d-axis component of the detected load current, and the power-factor varies when there is a fluctuation in the d-axis component. Further, there is such a problem that the response speed tends to vary when there is an error in the DC component of the q-axis component and the output torque tends to fluctuate when there is fluctuation in the q-axis component.

Further, the sampling of the load current in the above described current feedback loop is performed only once when the PWM voltage applied to the servomotor is zero as shown in the timing chart of FIG. 11, or at the middle point of the control period of the current feedback loop. Even if the sampled value of current happened to be abnormal, the sampled value is used as the feedback value of the current feedback loop and calculation of the command value of current is performed according to the sampled value. Therefore, the conventional servo-control has a problem that the PWM voltage swings and the torque or velocity variation becomes greater.

SUMMARY OF THE INVENTION

An object of the present invention is to prevent fluctuation of the output torque of a servomotor in a digital servo control system.

Another object of the present invention is to improve efficiency and stabilization of response speed in a digital servo control system.

According to a first feature of the present invention, an electrical angle $\theta_1$ at the time when the present value of each phase current is detected and an electrical angle $\theta_2$ at the time when the load current is then feedback-controlled by the use of the aforesaid present value are obtained.

When the present value of the phase current is dq-transformed, the electrical angle $\theta_1$ is used. Since this electrical angle $\theta_1$ is an actual electrical angle at the time the current is detected, the d-axis component and the q-axis component of the current obtained by the dq-transformation are accurate values.

Theoretically, the d-axis component and the q-axis component do not depend on the electrical angle. Then, according to the difference between each of the d-axis and q-axis components of the detected current and the respective target values, the command values for each of the d-axis and q-axis components are calculated. Such command values do not include an electrical angle.

Then, the command values for the d-axis component and the q-axis component are inversely dq-transformed by an inverse transformation means, whereby the command values for the phase currents are calculated. At the time of the inverse transformation, the electrical angle $\theta_2$ corresponding to the timing at which the load current of each phase is then controlled is used. Hence, the accurate command value for the phase current corresponding to the timing of an actual current control is provided. More specifically, since the command value for the phase current varies as a sine function of the electrical angle, the accurate command value for the phase current can be obtained by the use of the precise electrical angle $\theta_2$ at the time of control.

As a result, the fluctuation of the output torque due to the digital current control for the servomotor can be prevented.

According to a second feature of the present invention, the calibration of a servo-control apparatus is performed when the calibration of parameters of current detection systems becomes necessary. The amplification factors, offset values, etc. of the amplifiers are temperature sensitive. Therefore, when the temperature variation is great, the frequency of the calibration is increased accordingly.

At the time of the calibration for the servo-control apparatus, the load currents are sampled for a predetermined period of time while the servomotor is kept running and the load currents at a plurality of points of time are detected. The detected currents of each of the phases are dq-transformed and, thereby, time-dependent characteristics of the d-axis and q-axis components are obtained. From the characteristics of the d-axis and q-axis components, such values as the amplitude of the DC component and the amplitude and phase of the fundamental wave, for example, are calculated. From these values, the parameters related to the amplification factor and the offset value of each current detection system can be calculated.

Then, at the time of the actual operation of the servo-control apparatus, the values of the detected currents obtained from the respective signals output from the respective amplifiers are corrected according to the above described parameters in a real time basis. Accordingly, since the values of the corrected detected currents are equivalent to the values detected by ideal current detection systems whose amplification factors are not variable with time or temperature and whose offset output values are constantly zero, the corrected detected currents are free from detection errors resulting from the current detection systems and correspond to real load currents.

In accordance with the d-axis components and the q-axis components obtained through dq-transformation of the above described corrected detected currents and their respective target values, the load currents are controlled in real time. Since the d-axis and q-axis components calculated from the corrected detected currents do not include the errors in the DC components and the undesirable fluctuation components, lowering of the power-factor, variation of the power-factor, changes in the response speed, and fluctuation of the output torque can be prevented.

According to a third feature of the present invention, the load currents of the servomotor are sampled plural times by the sampling means, during the remaining period in a predetermined control period after the point of time at which the wave form of the load current controlled by the command value of current has been stabilized.

Then, the average value of the currents sampled by the sampling means as described above is calculated, as the feedback value of the current feedback loop, by the calculation means. Here, the average value is a representative value of the plural sampled currents, for example, an arithmetic means value of the plural sampled currents from which the maximum value and the minimum value have been excluded, a representative value of the grade in which the sampled values are most frequently classified, and other values representative of the load current in the interval of the control period.

Since the command value of current is calculated from the feedback value which is an average value of the current sampled at the plural times after the current wave form has been stabilized, even if abnormal values are included in the sampled values, the command value of current is stable. Therefore, the current control becomes stable and, hence, the undesirable variation of the output torque of the servomotor can be suppressed.

BRIEF DESCRIPTION OF THE DRAWINGS

FIG. 10 is a timing chart showing the timing of processing in the current feedback loop of the apparatus of the above embodiment; and FIG. 11 is a timing chart showing the timing of processing in the current feedback loop in a conventional apparatus.

DESCRIPTION OF THE INVENTION

The present invention will be described below as related to its particular embodiments.

First embodiment

1. Structure of the apparatus

Figure 1:
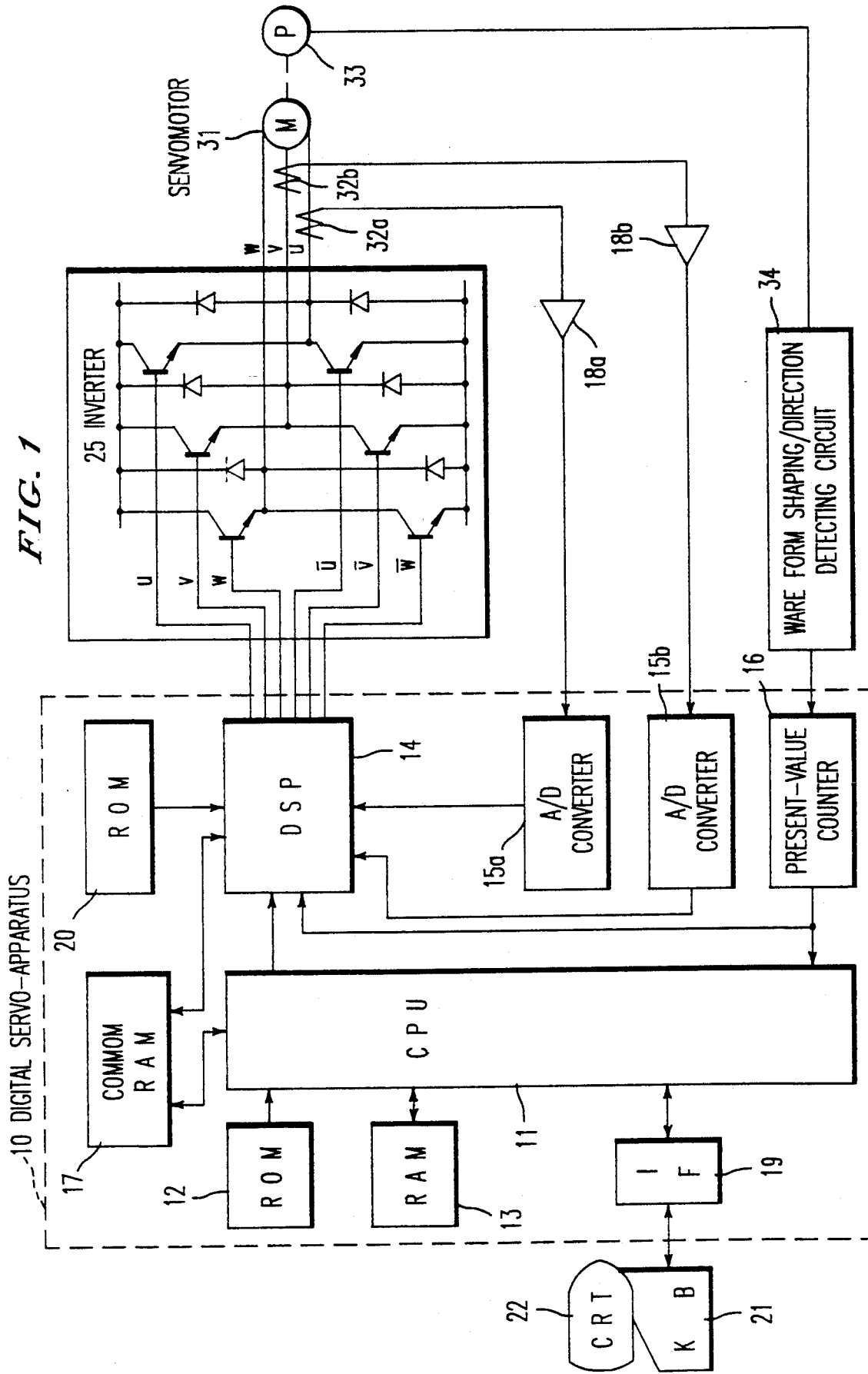
FIG. 1 is a block diagram showing structure a digital servo-control apparatus according a particular embodiment of the present invention.

FIG. 1 is a block diagram showing structure of a digital servo-control apparatus according to the present invention.

The digital servo-control apparatus 10 is chiefly structured of a CPU 11, a ROM 12, a RAM 13, a digital signal processor (hereinafter called "DSP") 14, a common RAM 17, A/D converters 15a and 15b, and a present-value counter 16. The CPU 11 is connected with a keyboard 21 and a CRT display 22 through an interface 19. The DSP 14 is composed of a CPU and interfaces.

The outputs of the DSP 14 are input into an inverter 25 and the inverter 25 drives the servomotor 31 responding to the output signals of the DSP 14. The inverter comprises two transistors connected in series for the respective phases. A synchronous motor is used as the servomotor 31. The load current to the servomotor 31 is controlled by the inverter 25 by means of the PWM voltage control so that its output torque is equal to the target value.

The load currents of the phase u and the phase v of the servomotor 31 are detected by CTs 32a and 32b and amplified by amplifiers 18a and 18b, respectively. The outputs of the amplifiers 18a and 18b are input into A/D converters 15a and 15b, in which they are sampled at intervals of a predetermined period and converted into digital values. The sampled values are input to the DSP 14 as the feedback values of the instantaneous load currents.

The servomotor 31 is connected to a pulse encoder 33 which detects its present position. The output of the pulse encoder 33 is connected, through a wave form shaping/direction determining circuit 34, to the present-value counter 16.

The output signal of the pulse encoder 33 inputs into the present-value counter 16 through the wave form shaping/direction determining circuit 34 to increase or decrease the count value in the present-value counter 16. The count value in the present-value counter 16 is read by the DSP 14 as the feedback value of the position feedback loop (herinafter "present-position feedback value"), and, in the DSP 14, it is compared with the target position output from the CPU 11, whereby a position deviation is calculated. The DSP 14 calculates a target velocity according to the position deviation.

The present-position feedback value input to the DSP 14 is differentiated therein to get the feedback value of the velocity feedback loop (hereinafter "velocity feedback value"). By the DSP 14, the target velocity determined according to the position deviation is compared with the velocity feedback value to get a velocity deviation, and, according to the velocity deviation, the d-axis and q-axis components of a target current are calculated, where the target d-axis component is zero.

Such dq-components of target current are compared, by the DSP 14, with the dq-components of the feedback values of the current feedback loop (hereinafter "current feedback values"), which have been detected by the CTs 32a and 32b and received through the amplifiers 18a and 18b and the A/D converters 15a and 15b, and the current deviation in the dq-coordinate system, i.e., the deviation of the dq-components, is obtained. By calculation performed on the basis of the then obtained instantaneous current deviation, an accumulative value of the instantaneous current deviation, and the target current in the dq-coordinate system, that is, by proportional-plus-integral calculation, the dq-components of an instantaneous command value of current (hereinafter the dq-components are called "dq-component command values") at that time can be calculated. The dq-component command values are inversely dq-transformed to get the instantaneous command value of current for controlling each load phase (hereinafter command value of current is called "current command value).

This instantaneous current command value is compared with a high-frequency triangular wave and, thereby, respective voltage control PWM signals for on/off controlling the transistors of each phase in the inverter 25 are generated. The voltage control PWM signals are output to the inverter 25 and the two series-connected transistors for each phase in the inverter 25 are thereby controlled. By means of the switching of the transistors in the inverter 25, the load current of each phase is controlled to conform to the target current.

The positioning of the servomotor 31 is completed when it is determined by the CPU 11 that the output value of the present-value counter 16 has become equal to the target position.

The load currents of the phase u and the phase v sampled by the A/D converters 15a and 15b are dq-transformed by the DSP 14.

The digital servo-control system of the present embodiment is formed, as described above, of three feedback loops for a position, velocity, and current. The inner the feedback loop is, the higher response speed is required of it. For example, in the innermost feedback loop, i.e., the current feedback loop, the period of sampling and controlling of the current is 100 $\mu$S. In the velocity feedback loop, the period is several times as long as that of the current feedback loop. In the position feedback loop, the period is several times as long as that of the velocity feedback loop.

2. Operation of the apparatus

Below will be described the operation of the apparatus according to the present invention.

Figure 2:
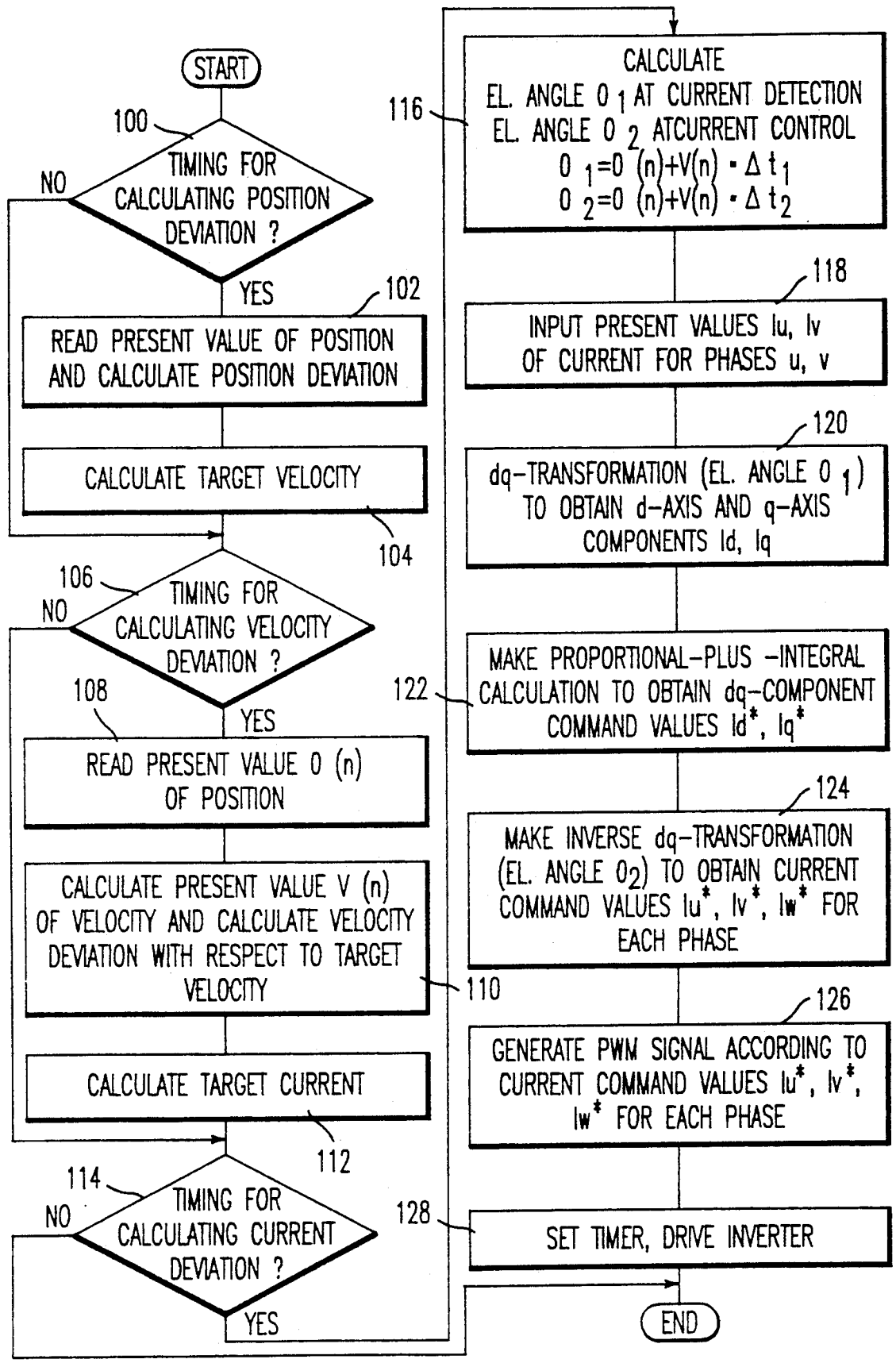
FIG. 2 is a flow chart showing a sequence of processes executed by a DSP in FIG. 1 used in the apparatus of the above embodiment.

The program shown in FIG. 2 is repeatedly executed by the CPU of the DSP 14 at intervals of a predetermined minimum period.

In step 100, it is determined whether or not the present execution cycle is at the timing for calculating a position deviation. If the execution cycle is at the timing for calculating the position deviation, then, in step 102, the present value of position held by the present-value counter 16 is read and its position deviation from the target position is calculated.

Then, in step 104, the target velocity is calculated according to the position deviation. The feedback control of position is executed at the timing indicated by a signal S1 in FIG. 3.

Then, in step 106, it is determined whether or not the execution cycle is at the timing for calculating the velocity deviation. If the execution cycle is at the timing for calculating the velocity deviation, the present value of position (electrical angle) $\theta(n)$ held by the present-value counter 16 is read in step 108.

Then, in step 110, the present value of velocity $V(n)$ is calculated from $\theta(n)$, the present value of position (electrical angle) $\theta(n-1)$ read at the preceding timing for calculating velocity deviation and the velocity-control period T, according to the following equation.

$$V(n) = (\theta(n) - \theta(n-1))/T \quad (1)$$

Also in step 110, the deviation with respect to the target velocity calculated in step 104, i.e., the velocity deviation, is calculated. In the next step 112, according to the velocity deviation, the d-axis component and the q-axis component of the target current are calculated. Such feedback control of velocity is executed at the timing indicated by a signal S2 in FIG. 3.

Then, in step 114, it is determined whether or not the execution cycle is at the timing for calculating a current deviation. If it is at the timing for calculating the current deviation, step 116 is followed. The operations performed in the step 116 and the steps following it are for the current feedback control, which control is executed at the timing indicated by a signal S3 in FIG. 3.

In the step 116, using the time $\Delta t_1$ of the current detection to be executed in the next step 118, measured from the start of the current control period and the time $\Delta t_2$ to actually control the load current at measured from the start of the current control period, the corresponding electrical angles, i.e., the electrical angle $\theta_1$ at the time of current detection and the electrical angle $\theta_2$ at the time of current control are calculated by extrapolation calculation according to the following equations.

$$\theta_1 = \theta(n) + V(n) \cdot \Delta t_1 \quad (2)$$

$$\theta_2 = \theta(n) + V(n) \cdot \Delta t_2 \quad (3)$$

Figure 3:
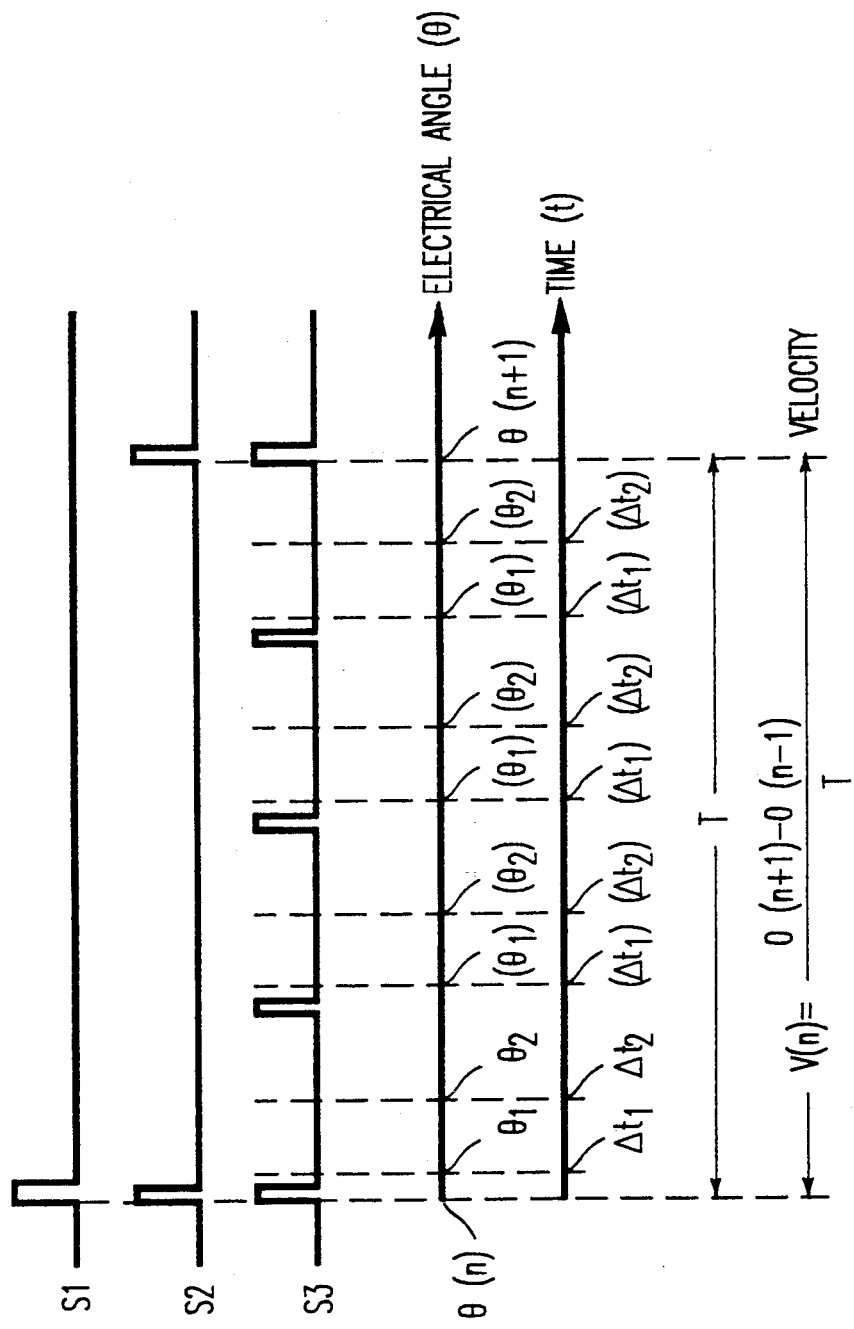
FIG. 3 is a timing chart showing the timing of the feedback control of position, velocity, and current executed by the DSP in FIG. 1 used in the apparatus of the above embodiment.

Here, the time $\Delta t_1$ and the time $\Delta t_2$ correspond to the electrical angles $\theta_1$ and $\theta_2$ as shown in FIG. 3.

Then, in step 118, the present values Iu and Iv of the instantaneous load currents of the phase u and the phase v are read from the A/D converters 15a and 15b as the current feed back values.

Then, in step 120, the present values Iu and Iv of the current are dq-transformed, and the d-axis component Id and the q-axis component Iq, i.e., the dq-components of the current feed back values, are calculated by the following equations.

$$Id = \sqrt{2} \{Iu \cdot \sin(\theta_1 + 2\pi/3) - Iv \cdot \sin\theta_1\} \quad (4)$$

$$Iq = \sqrt{2} \{Iu \cdot \cos(\theta_1 + 2\pi/3) - Iv \cdot \cos\theta_1\} \quad (5)$$

As well known, the dq coordinate system is such that it is constituted by the d-axis taken in phase with the exciting magnetic field, i.e., parallel to the field and the q-axis taken with a phase difference of 90° in electrical angle from the exciting magnetic field, the d and q-axes rotating with the field. The d-axis component represents the reactive component and the q-axis component represents the active component.

Then, in step 122, with the d-axis component and the q-axis component of the target current calculated in step 112 taken as reference values, the d-axis and q-axis components of the current command value, i.e., dq-component command values Id* and Iq* at the present point of time are calculated by proportional plus-integral calculation.

Then, in step 124, the dq-component command values Id* and Iq* are subjected to inverse dq-transformation and the current command value Iu*, Iv*, or Iw* for each of the phases is calculated as follows.

$$Iu^* = \sqrt{2/3} \{Id^* \cdot \cos\theta_2 - Iq^* \cdot \sin\theta_2\} \quad (6)$$

$$Iv^* = \sqrt{2/3} \{Id^* \cdot \cos(\theta_2 + 2\pi/3) - Iq^* \cdot \sin(\theta_2 + 2\pi/3)\} \quad (7)$$

The value Iw* is calculated by $Iw^* = -(Iu^* + Iv^*)$.

Then, in step 126, making use of the relationship between the levels of the current command values Iu*, Iv*, and Iw* for each of the phases and the high frequency triangle wave, i.e., by using the average voltage method, the ON time of the PWM signal for each phase is calculated.

Then, in step 128, each ON time is set up in each timer incorporated in the DSP 14, whereby the respective PWM signals for each phase which are held at a high level during the set periods of time are output to the inverter 25. And also the respective inverted PWM signals for each phase are output to the inverter 25. Although it is not shown expressly, a dead time is provided with the PWM and inverted PWM signals so that two transistors connected in series for each phase do not simultaneously turn on.

In this way, the operations of one execution cycle are completed. The execution cycle is executed during the minimum control period. In steps 100, 106, and 114, the number of times used as criteria of judgment are set up such that the current feedback loop is controlled at an integer multiple n1 of the aforesaid minimum control period, the velocity feedback loop is controlled at an integer multiple n2 of that period, and the position feedback loop is controlled at an integer multiple n3 of that period, where $n1 < n2 \leq n3$.

By repeated execution of the above described cycles, the feedback control for a position, velocity, and current is executed at the timing shown in FIG. 3.

During the current feedback control, as described above, the electrical angle $\theta_1$ at the time of current detection is used for dq-transformation and the electrical angle $\theta_2$ at the time of current control is used for inverse dq-transformation, and therefore it is possible to calculate accurate phase current command values. Consequently, variation of the output torque of the servomotor can be prevented from occurring.

3. Effects produced by the apparatus

The apparatus of the present embodiment, as described above, comprises angle calculation means for calculating the electrical angle $\theta_1$ at the time when the present value of the phase current is detected and the electrical angle $\theta_2$ at the time when, after feeding back the aforesaid present value, the load current is actually controlled, transformation means for dq-transforming the present value of the phase current by using the electrical angle $\theta_1$, and inverse transformation means for inverse-dq-transforming the dq-component command values to get the current command value for each phase by using the electrical angle $\theta_2$.

Since, as described above, the apparatus of the present embodiment uses the accurate actual electrical angle at the time of its detecting the phase current and that at the time of its controlling the phase current, it can perform precise transformation and obtain the extremely accurate current command value for each phase. Accordingly, the output torque of the servomotor can be prevented from fluctuation which may otherwise occur due to the use of a constant electrical angle during the velocity control period as was the case with the prior art.

Second embodiment

1. Structure of the apparatus

The apparatus of the second embodiment is identical, in structure, to the apparatus of the first embodiment shown in FIG. 1. However, it differs from the apparatus of the first embodiment in the following points.

When the present apparatus is in its calibration mode, the d-axis components and the q-axis components of the load currents transformed by the DSP 14 are stored in the common RAM 17, during a predetermined period of time. The d-axis components and the q-axis components stored in the common RAM 17 are also read by the CPU 11 in the calibration mode and used for calibrating calculation. Correction parameters for the amplifiers 18a and 18b calculated by the CPU 11 are stored in the common RAM 17.

When the apparatus is in its execution mode for performing the actual operation, the DSP 14 performs calculation for correcting the output values of the A/D converters 15a and 15b on the basis of the calibration parameters stored in the common RAM 17 and, thereafter, it provides the detected load current value of each phase.

2. Operation of the apparatus

Figure 4:
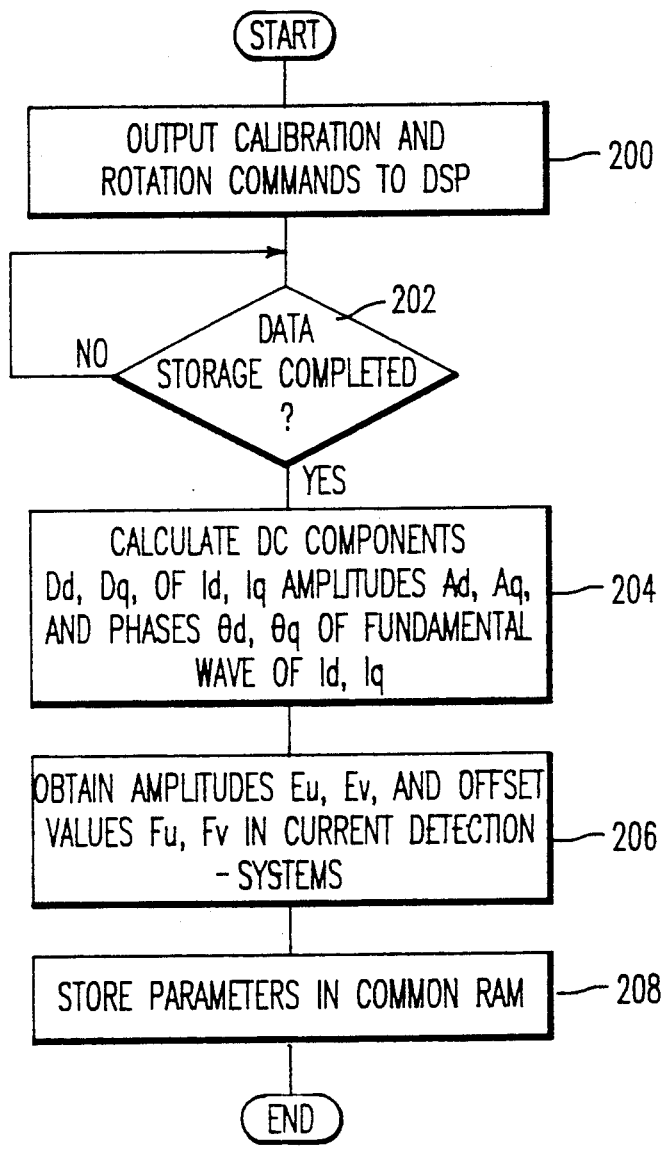
FIG. 4 is a flow chart showing a sequence of processes executed by the CPU shown in FIG. 1 used in the digital servo-control apparatus according to another embodiment.

The calibration program executed by the CPU 11 shown in FIG. 4 is stored in the ROM 12. The CPU 11, upon receiving an instruction for starting the calibration mode from the keyboard, executes the calibration program stored in the ROM 12.

In step 200, the CPU 11 gives the DSP 14 a rotation command for a predetermined quantity together with a calibration command.

Figure 5:
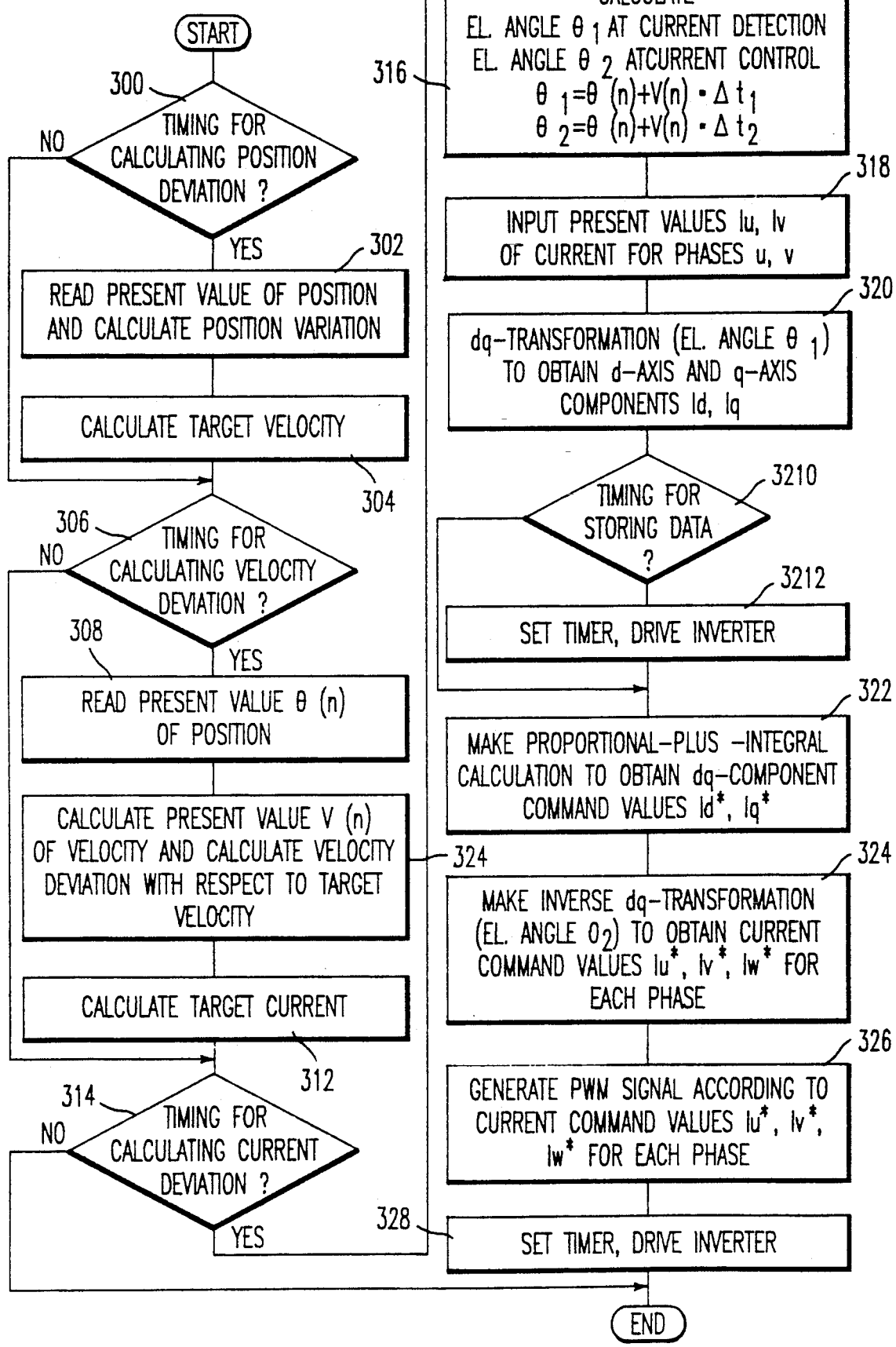
FIG. 5 is a flow chart showing a sequence of processes executed by the DSP shown in FIG. 1 used in the digital servo-control apparatus according to the above embodiment.

The DSP 14, upon receipt of the command signal, executes the program shown in FIG. 5 stored in a ROM 20.

The program of FIG. 5 is repeatedly executed at intervals of a predetermined minimum period.

The steps 300-320 precisely correspond to the steps 100-120 in FIG. 2 of the first embodiment.

The steps 300-320 are executed in the same processes as the corresponding processes of FIG. 2.

After execution of the steps 300-320, in step 3210, it is determined whether or not the present execution cycle is at the timing for storing data. If it is at the data storing timing, then, in step 3212, the present values Id and Iq of the current are stored in the common RAM 17.

The steps 322-328 precisely correspond to the steps 122-128 in FIG. 2. The steps 322-328 are executed in the same processes as in FIG. 2.

In this way, the operations of one execution cycle are completed. The execution cycle is executed during the minimum control period. In steps 300, 306, and 314, the number of times used as criteria of judgment are set up such that the current feedback loop is controlled at an integer multiple n1 of the aforesaid minimum control period, the velocity feedback loop is controlled at an integer multiple n2 of that period, and the position feedback loop is controlled at an integer multiple n3 of that period, where $n1 < n2 \leq n3$.

While the above described cycle is repeatedly executed, the present values of the d-axis component and the q-axis component of the load current are stored in the common RAM 17 for a predetermined period of time. These components are shown in FIG. 7 and FIG. 8, in which these components have the DC component and a characteristic varying with time.

Figure 7:
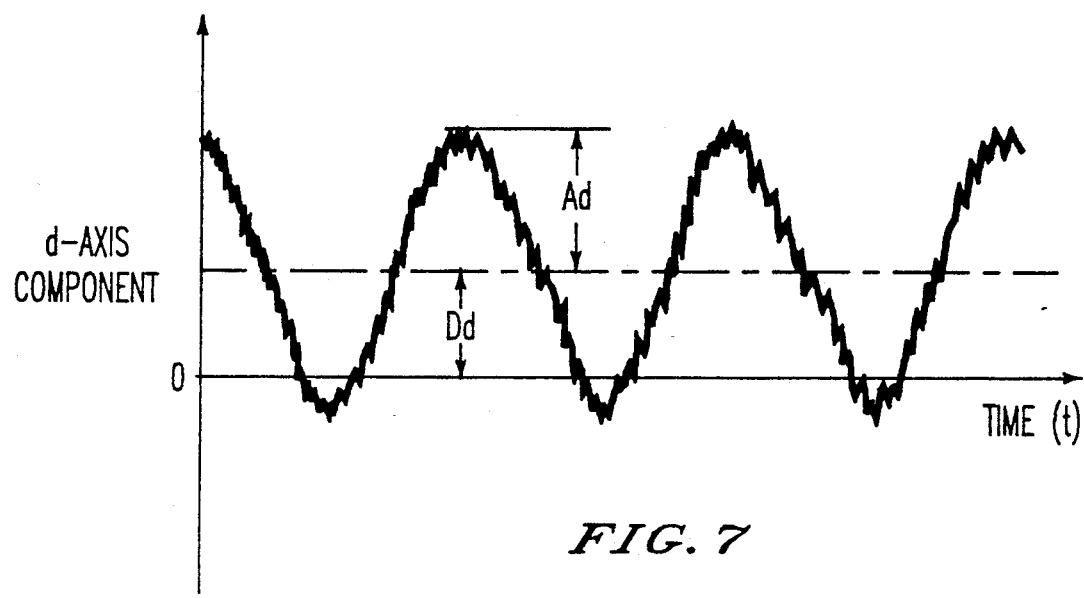
FIG. 7 is a characteristic diagram showing time-dependent characteristics of the d-axis component of the detected load current in a conventional apparatus.
Figure 8:
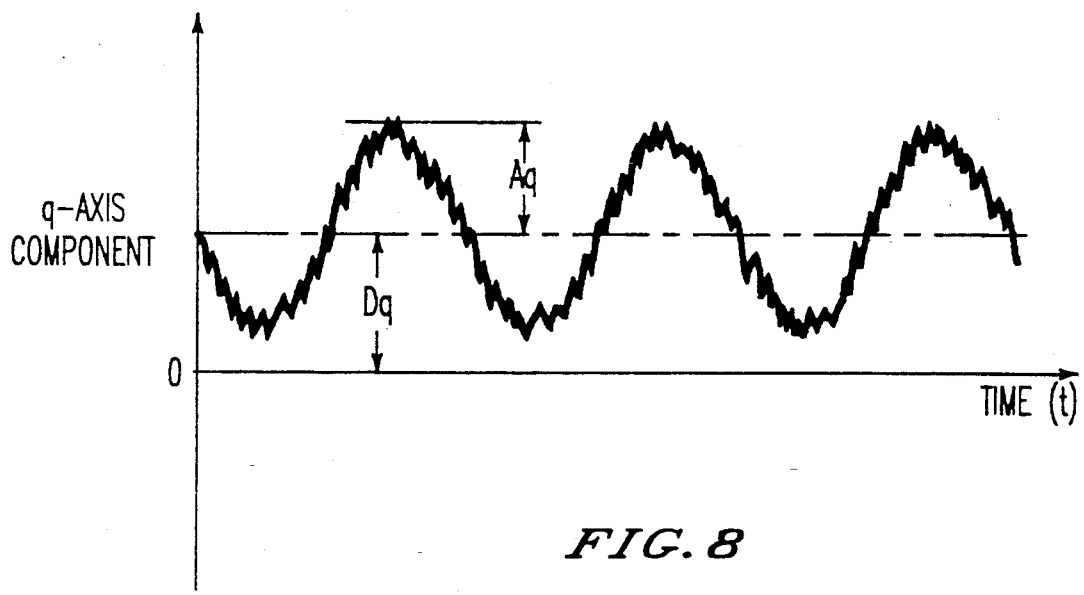
FIG. 8 is a characteristic diagram showing time-dependent characteristics of the q-axis component of the detected load current in the conventional apparatus.

As to the steps of procedure taken by the CPU 11, if it is determined that storage of data is completed in step 202 of FIG. 4, then, in step 204, the DC component Dd and the amplitude Ad and phase $\phi d$ of the fundamental wave are obtained from the measured time-dependent characteristics of the d-axis component Id shown in FIG. 7 and, further, the DC component Dq, the amplitude Aq and phase $\phi q$ of the fundamental wave are obtained from the measured time-dependent characteristics of the q-axis component Iq shown in FIG. 8.

Then, in step 206, the amplitudes Eu and Ev and the offset values Fu and Fv of the outputs of the amplifiers 18a and 18b are calculated from the above obtained values. The relative method will be described below.

The output characteristics of the current detection systems including the CTs 32a and 32b and the amplifiers 18a and 18b are assumed to be expressed as $$Iu = -Eu \cdot \sin\theta + Fu \tag{8}$$

$$Iv = -Ev \cdot \sin(\theta + 2\pi/3) + Fv \tag{9}$$

where Eu, Ev represent the amplitudes of the outputs and Fu, Fv represent the offset values.

By dq-transforming the currents represented by the equations (8), (9) using the equations (4), (5), we obtain $$Id = \sqrt{2}/4 \{2(Eu - Ev)\cos\alpha - 2(Fu + 2Fv)\sin\theta + 2\sqrt{3} Fu \cdot \cos\theta - (Eu - Ev)\} \tag{10}$$

$$Iq = \sqrt{2}/4 \{2(Ev - Eu)\sin\alpha - 2(Fu + 2Fv)\cos\theta - 2\sqrt{3} Fu \cdot \sin\theta + \sqrt{3}(Eu + Ev)\} \tag{11}$$

where $\alpha = 2\theta + 2\pi/3$.

Expressions (10), (11) include a DC component, a fundamental wave with a period of $2\pi$, and a second harmonic with a period of $4\pi$.

Therefore, using the measured DC components Dd and Dq of the d-axis component Id and the q-axis component Iq, Eu, Ev are obtained from the following equations.

$$Eu = \sqrt{2}(-Dd + Dq/\sqrt{3}) \tag{12}$$

$$Ev = \sqrt{2}(Dd + Dq/\sqrt{3}) \tag{13}$$

The offset values Fu, Fv are obtained, using the amplitudes Ad, Aq and the phases $\phi d$, $\phi q$ of the fundamental waves, as the values satisfying the following equations.

$$Ad^2 = 2(Fu^2 + FuFv + Fv^2) \tag{14}$$

$$\tan(\phi d) = -3Fu/(Fu + 2Fv) \tag{15}$$

$$Aq^2 = 2(Fu^2 + FuFv + Fv^2) \tag{16}$$

$$\tan(\phi q) = -(Fu + 2Fv)/\sqrt{3}\,Fu \tag{17}$$

Of the above equations, it is only required to use either the set of (14) and (15) or the set of (16) and (17).

In this way, the amplitudes Eu, Ev and the offset values Fu, Fv of the current detection systems are calculated.

Then, in step 208, correction parameters Ku, Kv and Fu, Fv to be used by the DSP 14 for correcting the present values of the detected load current during the execution mode are stored in the common RAM 17.

The correction parameters Ku and Kv are correction parameters of the amplitudes and defined by the following equations.

$$EU = KU \cdot G \tag{18}$$

$$EV = KV \cdot G \tag{19}$$

where G represents the amplitude of the output in the ideal state where the gains of the current detection systems for both the phases are equal and their offset values are zero, and this amplitude G is equal to the amplitude of the current command value Iu*, Iv*.

In the described manner, the operation in the calibration mode of the servomotor 31 is finished and the calculation of the correction parameters is completed.

Figure 6:
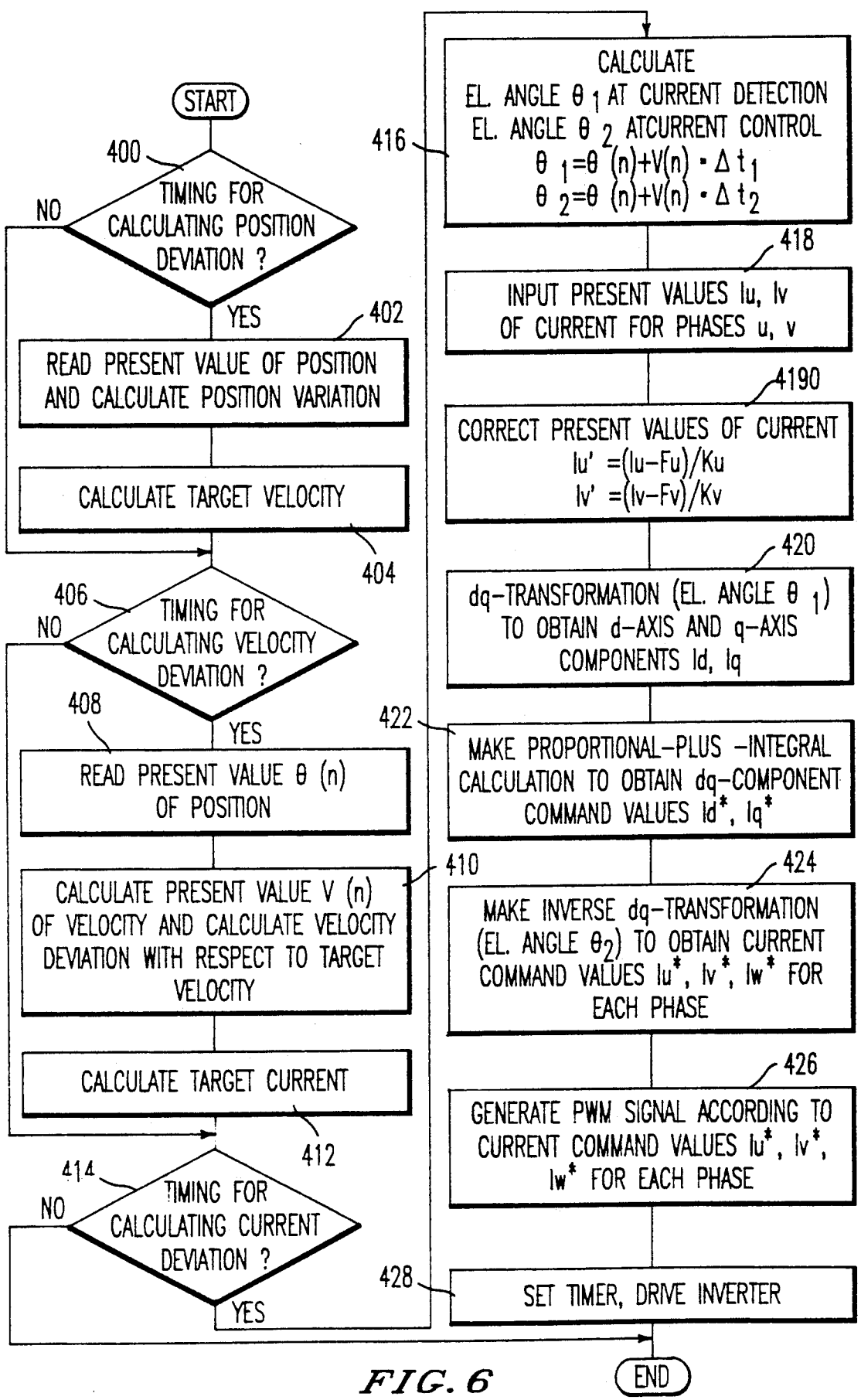
FIG. 6 is a flow chart showing a sequence of processes executed, during the actual operation of the servomotor, by the DSP shown in FIG. 1 used in the digital servo-control apparatus according to the above embodiment.

In actually driving the servomotor 31, an instruction for the execution mode is input from the keyboard 21. Then, the CPU 11 executes the positioning control successively according to the data stored in the RAM 13. At this time, the instruction for the execution mode and the target position are output from the CPU 11 to the DSP 14 every positioning cycle. Upon receipt of the instruction for the execution mode and the target position, the DSP 14 executes the execution program shown in FIG. 6. This program is identical to the calibration program shown in FIG. 5, except that the present values of the load currents are corrected and the present values are not stored.

And, the steps 400–418 precisely correspond to the steps 100–118 in FIG. 2. After the steps 400–418 are executed in the same processes as in FIG. 2, in step 4190, the present values Iu, Iv of the detected load currents of each of the phases are corrected in accordance with the following equations to thereby obtain the corrected present values Iu', Iv'.

$$Iu' = (Iu - Fu)/Ku \tag{20}$$

$$Iv' = (Iv - Fv)/Kv \tag{21}$$

Next, the steps 420–428 are executed in the same processes as in FIG. 2, the steps 420–428 precisely correspond to the steps 120–128 in FIG. 2.

By dq-transforming the corrected present values Iu', Iv', using these values as the detected present values of the load current, we obtain the d-axis component and the q-axis component, which are now free from the errors of the DC component and the fluctuation component which were causes of trouble as described in the foregoing.

Therefore, by using the dq-transformed components of the corrected present values as the current feedback values, the variation of the output torque is prevented from occurring and execution of control providing a high power-factor becomes possible. 3. Effects produced by the apparatus In the apparatus of the present embodiment, at the time of calibration of the servo-control apparatus, the outputs of the amplifiers are sampled at a plurality of points of time for a predetermined period, and, on the basis of the time-dependent characteristic of the d-axis component and the q-axis component obtained by the detected current transformation means, parameters related to the amplification factor and offset value of the current detection system formed of the current detection means and the amplifier are calculated, and at the time of actual driving of the servo-control apparatus, the values output from the amplifier are corrected according to the parameters on the real-time basis. Therefore, the detection error of the load current due to imbalance of the gains and the offsets between the respective current detection systems for each phase can be eliminated. Accordingly, it becomes possible to improve the operating efficiency of the servomotor and prevent a torque variation.

Third embodiment

1. Structure of the apparatus

The apparatus of the third embodiment is identical in structure to that of the first embodiment shown in FIG. 1.

2. Operation of the apparatus

Figure 9:
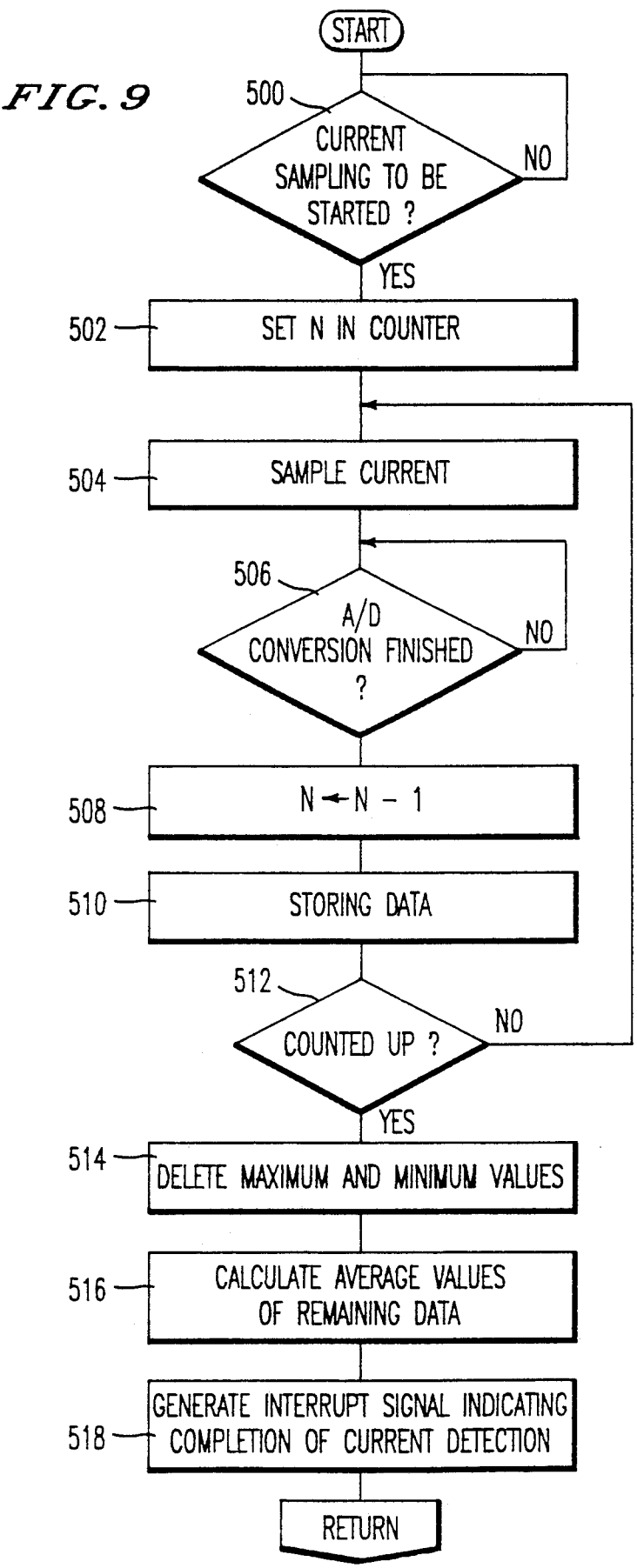
FIG. 9 is a flow chart showing a sequence of processes executed by the CPU shown in FIG. 1 used in the digital servo-control apparatus according to another embodiment.

Now, description will be made based on the flow chart in FIG. 9 showing the steps of procedure taken by the CPU 11 in FIG. 1 used in the apparatus of the present invention with reference to the timing chart of FIG. 10.

When it is judged in step 500 that the timing of the current sampling by the current feedback loop has come, step 502 is followed. In this case, in order that the current is sampled after the wave form of the current is stabilized, the timing of the start of the current sampling is set at the point of time when 50 μs, half the control period 100 μs of the current feedback loop, has passed.

In the step 502, the number of times N of the current sampling is set in the counter. This number of times N of the sampling in the present case is 5 because the sampling periods of A/D converters 15a and 15b are 10 μs.

Then in step 504, the load current is sampled, and then, in step 500, it is determined whether or not the A/D conversion for the sampled current has been finished. If the A/D conversion is finished, the decision in the step 500 will be YES. Then, step 508 is followed and therein 1 is subtracted from the number of times N of sampling.

Then, in step 510, the sampled data of the current are stored in the RAM 13. Then, step 512 is performed, in which it is determined whether or not the number of times N of sampling has become zero, i.e., it is counted up. When the number of times N of sampling is not zero, it means that it is not yet counted up and, hence, the decision in the step 512 will be No. Accordingly, returning to step 504, the steps 504-512 are executed again.

When the number of times N of sampling becomes zero, i.e., when five samplings have been finished, the decision in the step 512 becomes YES and step 514 is performed. In the step 514, the maximum value and the minimum value of the current data sampled and stored in the RAM 13 are deleted from the data. This process is for eliminating abnormal values from the values of the current sampled several times.

Then, in step 516, the remaining data not deleted in the step 514, i.e., the data of current sampled in three times and stored in the RAM 13 are operated upon for calculating the arithmetic mean value thereof.

The controlling procedure of the servomotor 31 in the present apparatus is the same as the controlling procedure in the servomotor 31 in the apparatus of the first embodiment shown in FIG. 2.

In step 518, an interrupt signal indicating completion of the current detection is generated. Then the decision in the step 114 of the program of FIG. 2 becomes YES, and thereafter, the step 116 and the following steps are executed, whereby the rotation control of the servomotor 31 is executed.

The average values of the currents for the u and v-phase calculated in the step 516 correspond to the present values Iu and Iv of the phase currents of the phase u and phase v in the step 118 in the program shown in FIG. 2. The $\theta_1$ used in steps 116 and 120 is a mean value of the electrical angles varying in the period of sampling.

Since, as described above, the detected values of the phase currents of the phase u and the phase v are obtained as the average value of the current sampled in plural times, the undesirable variations in the detected currents are small and therefore the output torque variation of the servomotor 31 can be suppressed.

In the apparatus of the present invention, the sampling means is provided by the steps 500 to 512 and the calculation means is provided by the steps 514 and 516.

3. Effects produced by the apparatus

The apparatus of the third embodiment comprises sampling means for sampling the load current in plural times during the period of time remaining in the predetermined control period after the point of time at which the wave form of the current controlled by the current command value has stabilized and calculation means for calculating the average of the values of the current sampled by the aforesaid sampling means as the current feedback value. Accordingly, the current command value calculated from the current feedback value, which is the average value of the detected current, is stabilized. Therefore, such an effect is obtained that the servomotor driven in accordance with such current command value can reduce an undesirable torque variation or velocity variation.

What we claim is:

1. A digital servo-control apparatus having a current feedback loop for sampling a load current to an AC servomotor of three-phase type at a predetermined control interval thereby obtaining a current feedback value and digitally controlling said load current according to said current feedback value and a target value of said load current, wherein said digital servo-control apparatus comprises:

current detection means for detecting, as said load current, load currents of at least two phases;

amplifiers for amplifying output values of said current detection means;

detected current transformation means for obtaining as said feedback value, from output values of said amplifiers, a d-axis component representing a reactive current component and a q-axis component representing an active current component in a dq-coordinate system;

parameter calculation means for sampling, during calibration of said servo-control apparatus, said output values of said amplifiers at a plurality of points of time during a predetermined period and determining, according to time-dependent characteristics of said d-axis component and said q-axis component obtained by said detected current transformation means, parameters related to amplification factors and offset values of current detection systems formed of said current detection means and said amplifiers; and correction means for correcting, according to said parameters calculated by said parameter calculation means, said output values of said amplifiers on a real-time basis while said servo-control apparatus is being driven during normal operation, wherein said parameters are determined so that fluctuations of said d-axis component and q-axis component are eliminated.

2. A digital servo-control apparatus according to claim 1, wherein said parameter calculation means calculates said amplification factors from respective DC components of said d-axis and q-axis components output from said detected current transformation means and calculates said offset values from an amplitude and phase of a fundamental wave of said d-axis or q-axis component output from said detected current transformation means.

3. A digital servo-control apparatus according to claim 1, wherein said apparatus further comprises:

command value obtaining means for obtaining dq-component command values for controlling said load current in said dq-coordinate system in accordance with respective deviations of said d-axis and q-axis components of said detected load current to respective target values;

inverse transformation means for inversely transforming said dq-component command values into a current command value for controlling said load current; and angle calculation means for calculating first and second electrical angles formed between a reference axis of an armature coil of said servomotor and an exciting magnetic field, said first electrical angle being used at the time when said load current is detected and said second electrical angle being used at the time when said load current is then digitally controlled;

wherein said detected current transformation means applies dq-transformation to said detected load current using said first electrical angle, thereby obtaining the d-axis component and the q-axis component of said load current, and said inverse-transformation means applies inverse-do-transformation to said dq-component command values using said second electrical angle, thereby obtaining said current command value for controlling said load current.

4. A digital servo-control method comprising the steps of:

detecting a load current to an AC servomotor;
amplifying said detected load current;
obtaining from said amplified load current value, a d-axis component representing a reactive current component and a q-axis component representing an active current component in a dq-coordinate system;
sampling at the time of calibrating said amplified load current value at a plurality of points of time during a predetermined period and calculating, according to time-dependent characteristics of said d-axis component and said q-axis component obtained, parameters related to an amplification factor and an offset value; and,
correcting according to the parameters calculated, the amplified load current value on a real-time basis.

* * * * *